(12) United States Patent
Peck

(10) Patent No.: US 8,887,842 B2
(45) Date of Patent: Nov. 18, 2014

(54) ARM-WHEEL TYPE VEHICLE

(75) Inventor: Jong-Yoon Peck, Changwon (KR)

(73) Assignee: Samsung Techwin Co., Ltd., Changwon (KR)

(*) Notice: Subject to any disclaimer, the term of this patent is extended or adjusted under 35 U.S.C. 154(b) by 3 days.

(21) Appl. No.: 13/489,592

(22) Filed: Jun. 6, 2012

(65) Prior Publication Data

US 2012/0313340 A1 Dec. 13, 2012

(30) Foreign Application Priority Data

Jun. 7, 2011 (KR) ........................ 10-2011-0054638

(51) Int. Cl.
*B60G 3/00* (2006.01)
*B62D 51/06* (2006.01)
*B60G 3/08* (2006.01)
*B60G 11/16* (2006.01)

(52) U.S. Cl.
CPC .............. *B60G 3/08* (2013.01); *B60G 2300/07* (2013.01); *B60G 2200/132* (2013.01); *B60G 2202/12* (2013.01); *B60G 2204/124* (2013.01); *B60G 11/16* (2013.01)
USPC .... 180/8.2; 180/8.3; 180/24.03; 280/124.128

(58) Field of Classification Search
USPC ................... 180/8.1, 8.2, 8.3, 24.03, 8.5, 8.6; 280/124.128
See application file for complete search history.

(56) References Cited

U.S. PATENT DOCUMENTS

| | | | |
|---|---|---|---|
| 1,290,293 A * | 1/1919 | Morski ........................ 267/250 |
| 2,080,546 A * | 5/1937 | Rudoni ........................ 267/278 |
| 2,403,833 A * | 7/1946 | Spangler ...................... 280/677 |
| 3,761,109 A * | 9/1973 | Campbell .............. 280/124.128 |
| 4,266,627 A * | 5/1981 | Lauber ........................... 180/8.3 |
| 4,432,425 A * | 2/1984 | Nitzberg ........................ 180/8.2 |
| 4,461,202 A * | 7/1984 | Appelblatt et al. .......... 89/40.03 |
| 4,526,106 A | 7/1985 | Okada et al. |
| 4,840,394 A | 6/1989 | Bickler |
| 4,964,480 A * | 10/1990 | Kopczynski .................... 180/22 |
| 5,547,207 A * | 8/1996 | Madler ......................... 280/104 |
| 5,692,767 A | 12/1997 | Kato |
| 6,092,823 A * | 7/2000 | Busby ........................... 280/284 |
| 6,112,843 A | 9/2000 | Wilcox et al. |
| 6,169,853 B1 * | 1/2001 | Hasushita et al. .............. 396/55 |
| 6,267,196 B1 * | 7/2001 | Wilcox et al. ................. 180/347 |
| 7,392,998 B2 * | 7/2008 | Runkel ................. 280/124.157 |
| 7,475,745 B1 | 1/2009 | DeRoos |
| 7,934,725 B2 * | 5/2011 | Brehob et al. ............. 280/5.517 |
| 7,950,675 B1 * | 5/2011 | Quenzi et al. .............. 280/6.157 |
| 8,162,335 B1 * | 4/2012 | Press ...................... 280/124.128 |
| 2004/0163869 A1 | 8/2004 | Chun et al. |
| 2004/0251651 A1 | 12/2004 | Yamamoto et al. |
| 2007/0228685 A1 * | 10/2007 | Bennett ................. 280/124.135 |

FOREIGN PATENT DOCUMENTS

| | | |
|---|---|---|
| JP | 8188023 A | 7/1996 |
| JP | 2003063411 A | 3/2003 |
| JP | 2004306733 A | 11/2004 |

* cited by examiner

*Primary Examiner* — Joseph M Rocca
*Assistant Examiner* — Marc A Scharich
(74) *Attorney, Agent, or Firm* — Sughrue Mion, PLLC

(57) ABSTRACT

Provided is an arm-wheel type vehicle including: a main body; an arm that is rotatably installed to the main body; a wheel connected to the arm; a first buffer device that is installed on the main body; and a second buffer device that is installed on the arm.

17 Claims, 7 Drawing Sheets

ARM-WHEEL TYPE VEHICLE

CROSS-REFERENCE TO RELATED PATENT APPLICATION

This application claims priority from Korean Patent Application No. 10-2011-0054638, filed on Jun. 7, 2011, in the Korean Intellectual Property Office, the disclosure of which is incorporated herein by reference in its entirety.

BACKGROUND

1. Field

Apparatuses consistent with exemplary embodiments relate to an arm-wheel type vehicle in which an impact applied to an arm-wheel may be mitigated.

2. Description of the Related Art

Related art industrial robots are designed to perform only assigned operations in an isolated workspace because of accident risks. However, recently, a need for various intelligent robots based on information communication technology such as human coexistence robots, medical and welfare robots, office robots, disaster prevention robots, construction robots, atomic-powered robots, education-and-entertainment-support robots, military robots, space exploration robots, has arisen. Aforementioned intelligent robots may have an autonomous movement function, and in such case, it is necessary to provide a driving or walking system to enable the robots to autonomously move to places where required operations are to be performed.

For the robots involved in dangerous or rugged operations, such as disaster prevention robots, military robots, and space exploration robots, an arm-wheel type vehicle technology using a wheel at an end of each of legs for transportation is appropriate. The arm-wheel type vehicle can move by lifting its legs and placing them on an obstacle such as a step, or going over such obstacles by rotating its wheels when it encounters.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide arm-wheel type vehicles in which an impact applied to an arm-wheel from a road surface may be effectively mitigated.

According to an aspect of an exemplary embodiment, there is provided an arm-wheel type vehicle, the arm-wheel type vehicle comprising: a main body; an arm which is rotatably installed to the main body; a wheel connected to the arm; a first buffer device that is installed on the main body and mitigates an impact moment generated in a rotational direction of the arms due to an external force applied to the wheel; and a second buffer device that is installed on the arm and mitigates an impact force generated in a length direction of the arm due to an external force applied to the wheel.

The arm may comprises: a lower arm portion of which a first end of the lower arm is connected to the wheel and of which a second end of the lower arm is connected to the second buffer device; an upper arm portion of which a first end of the upper arm is connected to the second buffer device and of which a second end of the upper arm is connected to an installation unit; the installation unit which is rotatably installed around an axis; and an operating portion that is installed on the installation unit and is connected to the first buffer device.

The first buffer device may comprise: a connection portion that is connected to the operating portion; and a first elastic member of which an end is connected to the connection portion.

The first buffer device further may comprise a first damper of which a first end is connected to the connection portion and a second end of the The arm-wheel type vehicle further may comprise a variable actuator that is installed on the main body, wherein a first end of the variable actuator is connected to the first elastic member.

The second buffer device may comprise a second elastic member, wherein a first end of the second elastic member is connected to the lower arm portion, and a second end of the second elastic member is connected to the upper arm portion.

The second buffer device further may comprise a second damper, wherein a first end of the second damper is connected to the lower arm portion, and a second end of the second damper is connected to the upper arm portion.

At least two arms may be installed on each side of the main body, and at least two of the plurality of arms may be installed on each side rotate around the same axis.

At least two arms may be installed on each side of the main body, and at least two of the plurality of arms may be installed on each side rotate around different axes.

The arm-wheel type vehicle further comprising a structure disposed on the main body, wherein the structure is an equipment suitable for a specific use of the arm-wheel type vehicle.

At least two arms are rotatably installed with respect to a same axis on a same side of the main body.

BRIEF DESCRIPTION OF THE DRAWINGS

The above and other aspects will become more apparent by describing in detail exemplary embodiments with reference to the attached drawings, in which.

DETAILED DESCRIPTION

Figure 1:
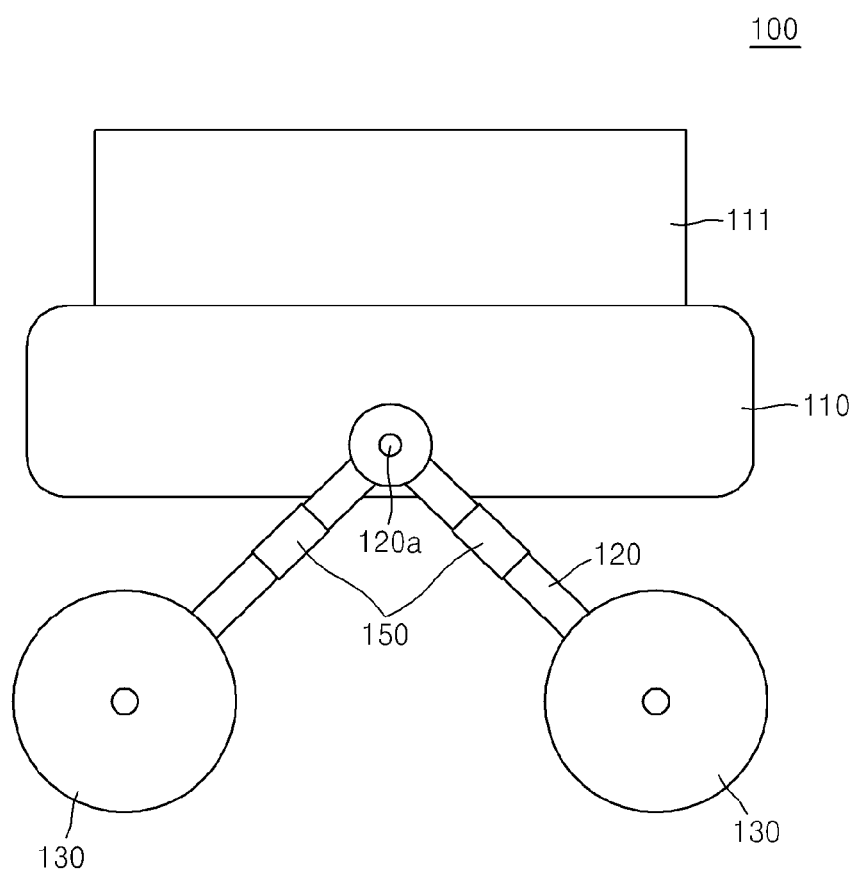
FIG. 1 is a schematic view illustrating an arm-wheel type vehicle according to an exemplary embodiment.

Hereinafter, exemplary embodiments will be described in detail with reference to the attached drawings. In the drawings, the same reference numerals denote the same members.

Figure 2:
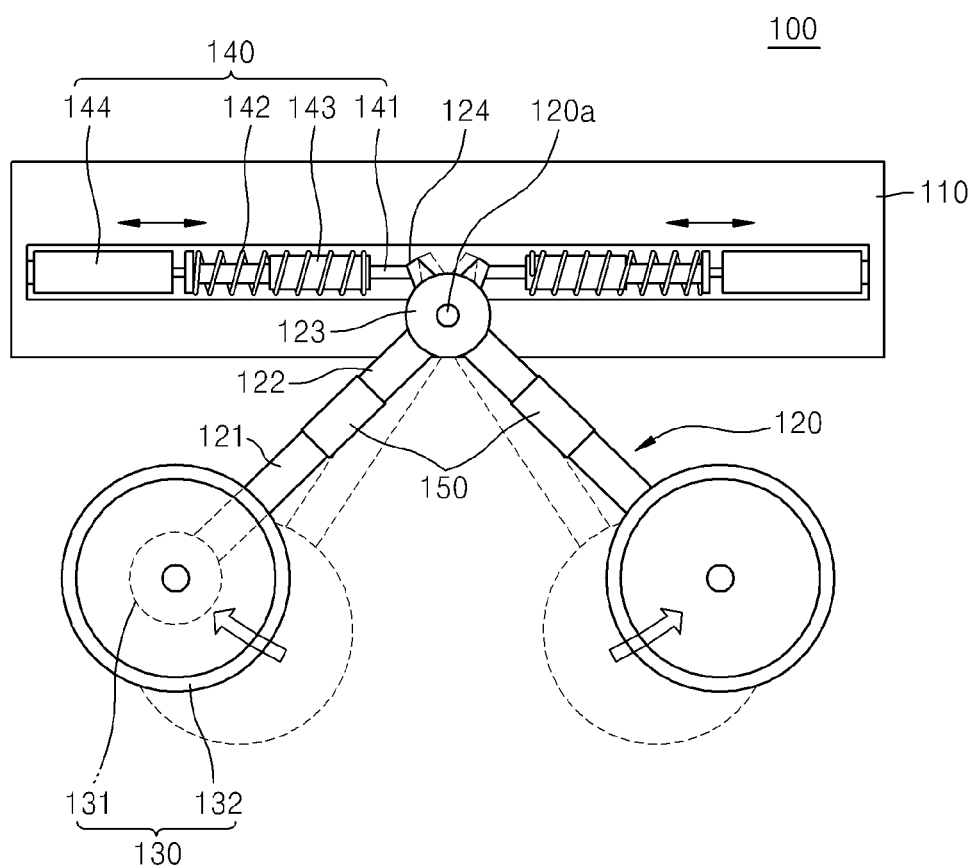
FIG. 2 is a schematic view illustrating an arm, a wheel, a first buffer device, and a second buffer device of an arm-wheel type vehicle, according to an exemplary embodiment.
Figure 3:
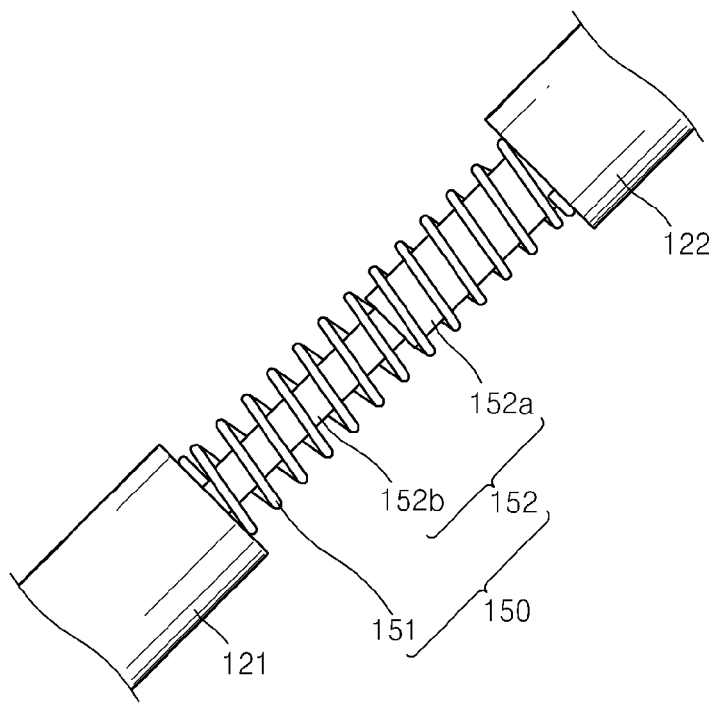
FIG. 3 is a schematic view illustrating a second buffer device according to an exemplary embodiment.
Figure 4:
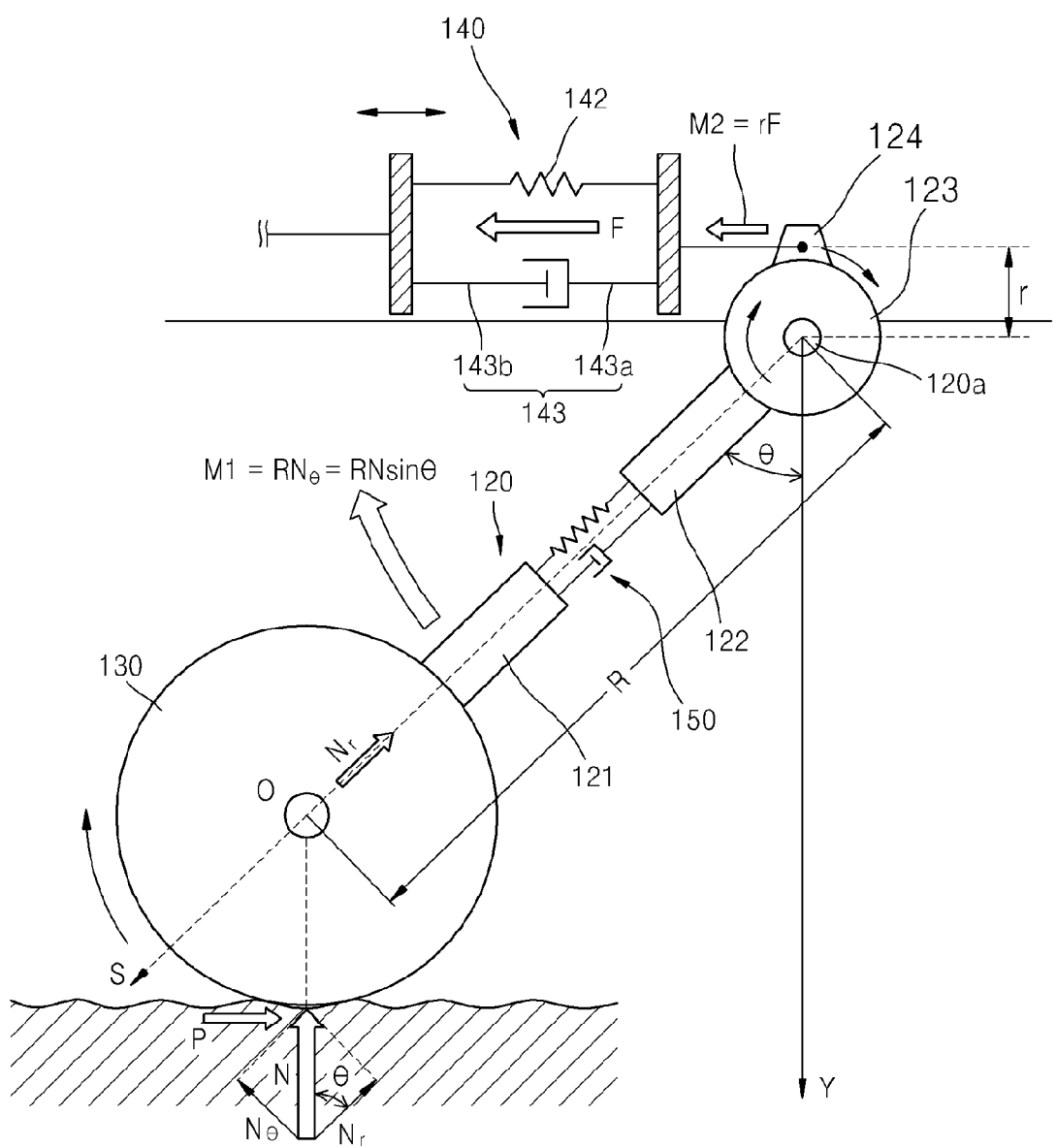
FIG. 4 is a schematic view illustrating an operational principle of an arm, a wheel, a first buffer device, and a second buffer device of an arm-wheel type vehicle, according to an exemplary embodiment.
Figure 5:
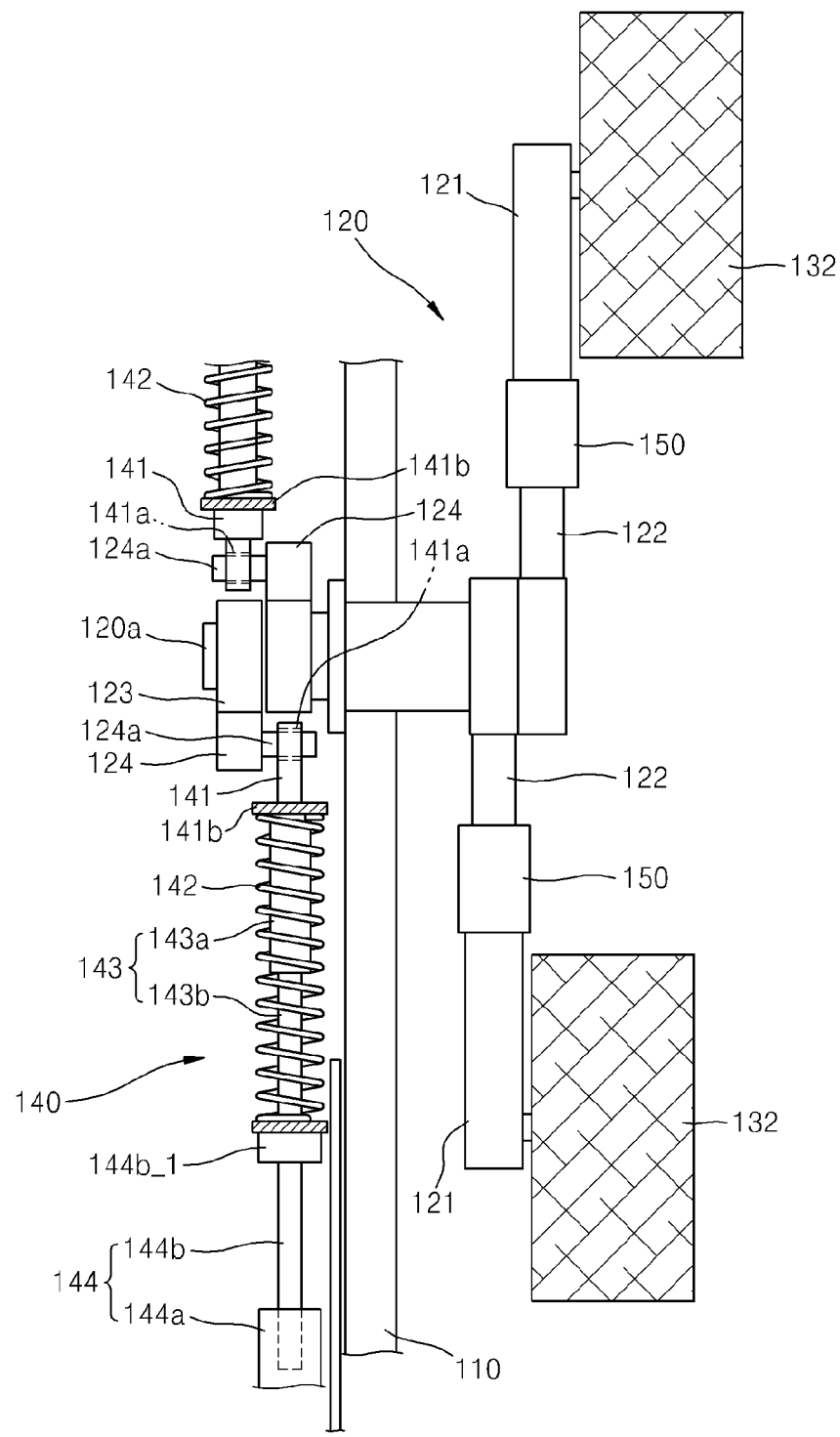
FIG. 5 is a schematic plan view illustrating an arm and a first buffer device of an arm-wheel type vehicle, according to an exemplary embodiment.
Figure 6:
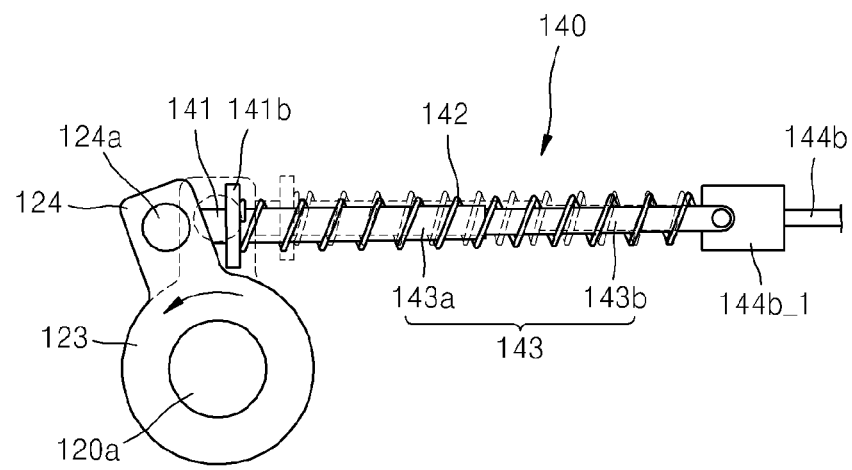
FIG. 6 is a schematic view illustrating an arm and an axis of an arm-wheel type vehicle in operation, according to an exemplary embodiment.

FIG. 1 is a schematic view illustrating an arm-wheel type vehicle 100 according to an exemplary embodiment. FIG. 2 is a schematic view illustrating an arm 120, a wheel 130, a first buffer device 140, and a second buffer device 150 of the arm-wheel type vehicle 100, according to an exemplary embodiment. FIG. 3 is a schematic view illustrating the second buffer device 150 according to an exemplary embodiment of the present invention. FIG. 4 is a schematic view illustrating an operational principle of the arm 120, the wheel 130, the first buffer device 140, and the second buffer device 150 of the arm-wheel type vehicle 100, according to an exemplary embodiment of the present invention. FIG. 5 is a schematic plan view illustrating the arm 120 and the first buffer device 140 of the arm-wheel type vehicle 100, according to an exemplary embodiment. FIG. 6 is a schematic view illustrating the first buffer device 140 of the arm 120 and an axis 120a of an arm-wheel type vehicle 100 in operation, according to an exemplary embodiment.

Referring to FIGS. 1 and 2, the arm-wheel type vehicle 100 includes a main body 110, a plurality of arms 120, a plurality of wheels 130, the first buffer device 140, and the second buffer device 150.

The main body 110 includes a frame of the arm-wheel type vehicle 100, and a structure 111 is disposed on the main body 110. The structure 111 is equipment suitable for a specific use of the arm-wheel type vehicle 100; for example, if the arm-wheel vehicle 100 is used for exploration, the structure 111 is exploration equipment.

On each side of the arm-wheel type vehicle 100, that is, on each of left and right sides, two arms 120 are installed.

The arms 120 are rotatably installed to the main body 110, and the arms 120 installed on each side are rotatably installed on the same axis 120a. The axis 120a is either a fixed axis or a rotating axis, and is supported on the main body 110 using, for example, a bearing.

According to the current exemplary embodiments of FIGS. 1 and 2, the arms 120 installed on each side are rotatably installed with respect to the same axis 120a, but the exemplary embodiment is not limited thereto. That is, according to another exemplary embodiment, the arms 120 installed on each side are also rotatably installed with respect to different axes.

Each of the arms 120 includes a lower arm portion 121, an upper arm portion 122, an installation unit 123, and an operating portion 124.

A first end of the lower arm portion 121 is connected to a wheel frame 131 of the wheel 130, and a second end of the lower arm portion 121 is connected to the second buffer device 150.

A first end of the upper arm portion 122 is connected to the second buffer device 150, and a second end of the upper arm portion 122 is connected to the installed unit 123.

The installed unit 123 is rotatably installed with respect to the axis 120a, and is connected to the upper arm portion 122 so as to rotate with the upper arm portion 122 when the upper arm portion 122 rotates.

The operating portion 124 is installed on the installed unit 123. As illustrated in exemplary embodiments of FIGS. 5 and 6, a connection pin 124a is formed on the operating portion 124 to be connected to the first buffer device 140.

The wheel 130 is connected to the lower arm portion 121 of each of the arms 120 as illustrated by the exemplary embodiment in FIG. 4.

The wheel 130 includes the wheel frame 131 and a wheel tire portion 132.

A brake (not shown), a wheel motor (not shown), and the like may be mounted on the wheel frame 131, and the wheel frame 131 is connected to the lower arm portion 121. Also, the wheel frame 131 rotatably supports the wheel tire portion 132.

The wheel tire portion 132 is disposed on an outer portion of the wheel frame 131 to directly contact a road surface.

Meanwhile, the first buffer device 140 is installed on the main body 110, and may mitigate an impact moment that is generated in a rotational direction of the arms 120 due to an external force applied to the wheel 130.

The first buffer device 140 includes a connection portion 141, a first elastic member 142, a first damper 143, and a variable actuator 144.

As illustrated in FIG. 5, a connection hole 141a is formed in the connection portion 141, and the connection pin 124a is inserted into the connection hole 141a to connect the operating portion 124 to the connection portion 141, and a support portion 141b is formed at an end of the connection portion 141.

A coil spring may be used as the first elastic member 142, and a first end of the first elastic member 142 is mounted on the support portion 141b, and a second end of the first elastic member 142 is mounted on the variable actuator 144.

Though the first elastic member 142 is formed of a coil spring, the exemplary embodiment is not limited thereto. That is, elastic members that are well-known in the art other than a coil spring may be used as the first elastic member 142.

The first damper 143 performs damping, and may be a hydraulic damper that uses oil as an operating fluid.

Though a hydraulic damper is used as the first damper 143 in the exemplary embodiment, the exemplary embodiment is not limited thereto. That is, a pneumatic damper that uses an air as an operating fluid may be used as the first damper 143. Also, a magnetorheological (MR) fluid damper of which viscosity varies according to a magnetic field may be used as the first damper 143.

As illustrated in exemplary embodiments of FIGS. 5 and 6, the first damper 143 includes a first cylinder portion 143a and a first piston portion 143b, and a portion of the first piston portion 143b is disposed inside the first cylinder portion 143a to perform damping. An end portion of the first cylinder portion 143a is mounted on the support portion 141b, and an end portion of the first piston portion 143b is mounted on an end portion 144b_1 of a moving portion 144b of the variable actuator 144.

According to the exemplary embodiment, the first buffer device 140 includes the first damper 143, but the exemplary embodiment is not limited thereto. That is, the first buffer device 140 may not include the first damper 143.

Meanwhile, as illustrated in the exemplary embodiment of FIG. 5, the variable actuator 144 includes a main portion 144a and the moving portion 144b. The main portion 144a is mounted on the main body 110, and the second end of the first elastic member 142 and the piston portion 143b of the first damper 143 is mounted on the end portion 144b_1 of the moving portion 144b.

When the moving portion 144b of the variable actuator 144 moves forward or backward according to a control of a controller (not shown) of the arm-wheel type vehicle 100, a position of the second end of the first elastic member 142 is also changed and thus a distance between the second end and the first end of the first elastic member 142 is changed. Accordingly, a magnitude of an elastic force exerted by the first elastic member 142 may vary, and operational performance of the first buffer device 140 may also be varied accordingly.

Meanwhile, the second buffer device 150 is installed on the arms 120, and mitigates an impact force generated in a length direction of the arms 120 (an S direction in FIG. 4) due to an external force applied to the wheel 130.

As illustrated in an exemplary embodiment of FIG. 3, the second buffer device 150 includes a second elastic member 151 and a second damper 152.

A coil spring may be used as the second elastic member 151, and a first end of the second elastic member 151 is connected to the lower arm portion 121, and a second end of the second elastic member 151 is connected to the upper arm portion 122.

The second elastic member 151 according to the exemplary embodiment may be formed of a coil spring, but the exemplary embodiment is not limited thereto. That is, elastic members well-known in the art other than a coil spring may be used as the second elastic member 151.

The second damper 152 performs damping, and may be a hydraulic damper that uses oil as an operating fluid.

Though a hydraulic damper is used as the second damper 152, the exemplary embodiment is not limited thereto. That is, a pneumatic damper that uses air as an operating fluid may be used as the second damper 152. Also, a magnetorheological (MR) fluid damper of which viscosity varies according to a magnetic field may be used as the second damper 152.

The second damper 152 includes a second cylinder portion 152*a* and a second piston portion 152*b*, and a portion of the piston portion 152*b* is disposed inside the second cylinder portion 152*a* to perform damping.

An end portion of the second cylinder portion 152*a* is connected to the upper arm portion 122, and an end portion of the second piston portion 152*b* is connected to the lower arm portion 121.

Hereinafter, impact mitigation of the arm-wheel type vehicle 100 according to an exemplary embodiment will be described with reference to FIGS. 4 and 5.

When the arm-wheel type vehicle 100 moves, an external force is applied to the wheel tire portion 132 from a road surface. As illustrated in the exemplary embodiment of FIG. 4, the wheel tire 132 receives a vertical impact force N and a horizontal impact force P.

Hereinafter, impact mitigation when the vertical impact force N is applied will be described first, and then impact mitigation when the horizontal impact force P is applied will be described.

The vertical impact force N applied to the wheel tire 132 may be split into two force components as shown in Equations 1 and 2 below (refer to FIG. 4).

[Equation 1]

$$N_\theta = N \cdot \sin\theta \quad (1)$$

[Equation 2]

$$N_r = N \cdot \cos\theta \quad (2)$$

Here, θ denotes an angle between a direction in which one arm 120 is inclined (the S direction) and a vertical axis y.

Accordingly, an impact moment M1 applied to the arm 120 and the wheel 130 in a clockwise direction due to the vertical impact force N may be represented by Equation 3 below.

[Equation 3]

$$M1 = R \cdot N_\theta = R \cdot N \cdot \sin\theta \quad (3)$$

where R denotes a distance between a center of the axis 120*a* and a center O of the wheel tire portion 132.

When the arm 120 rotates clockwise, the operating portion 124 also rotates clockwise. When assuming the moving portion 144*b* of the variable actuator 144 is fixed and not displaced from an initially set position, a length of the first elastic member 142 is increased, and the first piston portion 143*b* of the first damper 143 moves away from the first cylinder portion 143*a*.

As the first elastic member 142 is lengthened from its initial length in a state of equilibrium, the elastic force of the first elastic member 142, which biases the first elastic member 142 to return to its original state, acts in a direction to rotate the operating portion 124 in a counterclockwise direction. Moreover, a damping force is exerted by the first damper 143. By adding the elastic force of the first elastic member 142 and the damping force of the first damper 143, a counter force F due to the first buffer device 140 may be calculated, and an opposite moment M2 in the counterclockwise direction exerted on the operating portion 124 due to the counter force F may be represented by Equation 4 below.

[Equation 4]

$$M2 = r \cdot F \quad (4)$$

where r denotes a distance between a center of the axis 120*a* and the connection portion 141.

The above-described impact moment M1 may be offset by the opposite moment M2, thereby mitigating the vertical impact force N. Equation 5 applied in this case is as follows according to the principle of moment equilibrium.

[Equation 5]

$$R \cdot N \cdot \sin\theta = r \cdot F \quad (5)$$

Hereinafter, the impact mitigation of the vertical impact force N using the second buffer device 150 will be described.

In Equation 2, $N_r$ denotes an impact force exerted in the length direction of the arm 120 (S direction), which is sequentially transferred through the wheel tire portion 132, the wheel frame 131, and the lower arm portion 121, and finally arrives at the second elastic member 151 and the second damper 152.

As the second elastic member 151 and the second damper 152 are typical impact mitigating systems that are formed of a spring and a damper, the impact force $N_r$ exerted in the length direction of the arm 120 due to the impact mitigating systems may be mitigated.

The impact mitigation when the vertical impact force N is applied to the wheel 130 from a road surface is described as above. The impact mitigation when the horizontal impact force P is applied to the wheel 130 may be understood in the same manner as with the impact mitigation when the vertical impact force N is applied to the wheel 130, that is, by splitting the horizontal impact force P into a force in the length direction (S direction) of the arm 120 and a force in a direction perpendicular thereto. Thus, a detailed description thereof will be omitted here.

Meanwhile, as described above, since the first buffer device 140 of the arm-wheel type vehicle 100 includes the variable actuator 144, a state of a road surface may be monitored and the variable actuator 144 of the first buffer device 140 may be operated by using a computer program of the controller of the arm-wheel type vehicle 100 or manually. In this case, the elastic force of the first elastic member 142 may be adjusted by movement of the moving portion 144*b*, and thus performance of impact mitigation may be adjusted by a necessary amount.

As described above, as the arm-wheel type vehicle 100 includes the first buffer device 140, which mitigates an impact moment generated in the rotational direction of the arm 120, and the second buffer device 150, which mitigates an impact force generated in the length direction of the arm 120, an impact applied to the wheel 130 from a road surface may be effectively mitigated. Moreover, control capability of the arm-wheel type vehicle 100 may also be adjusted appropriately.

Figure 7:
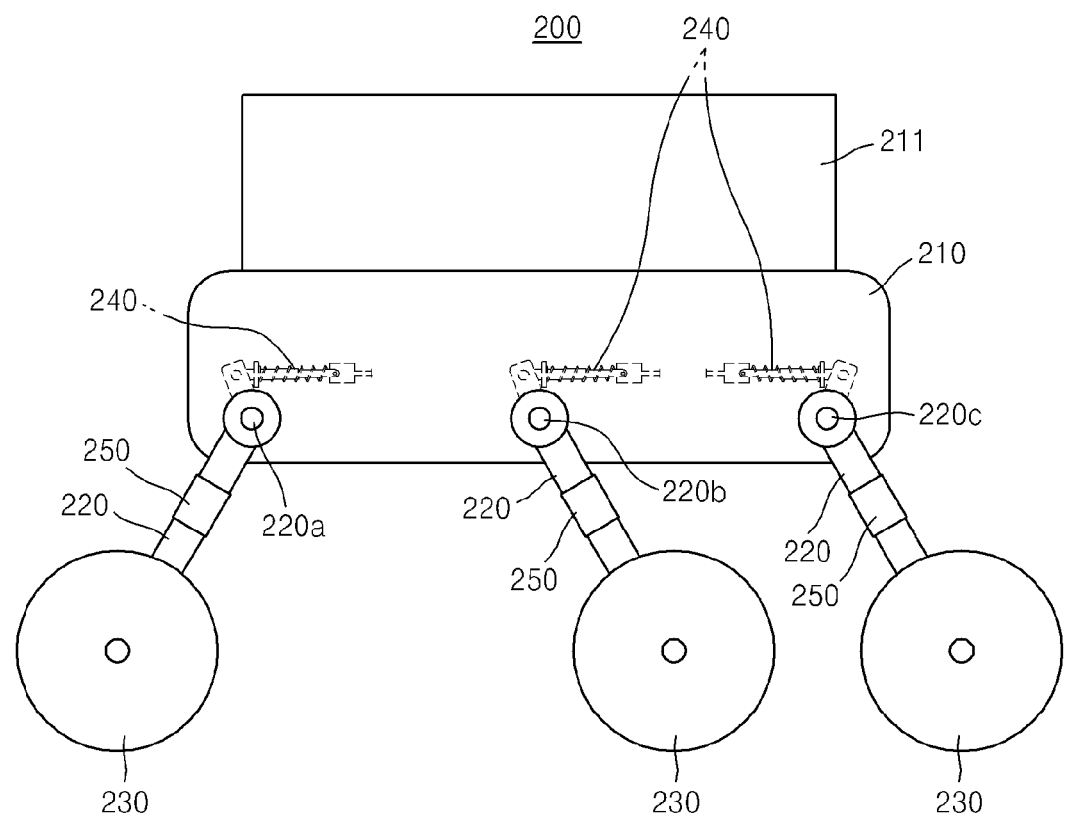
FIG. 7 is a schematic view illustrating an arm-wheel type vehicle according to another exemplary embodiment.
Figure 8:
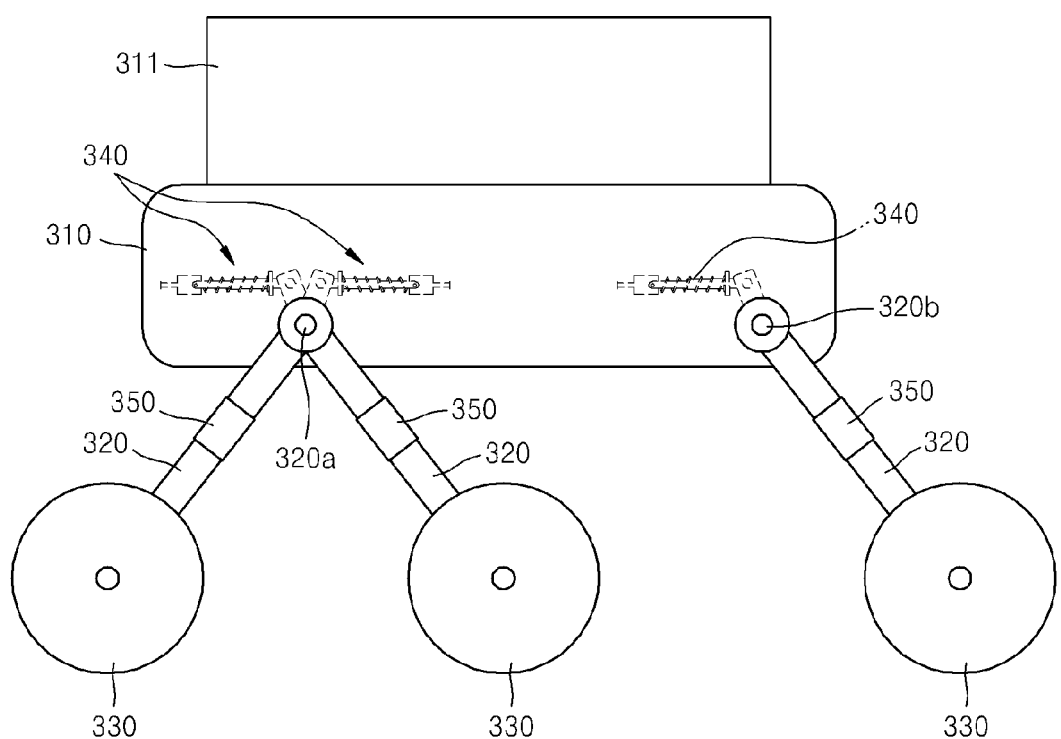
FIG. 8 is a schematic view illustrating an arm-wheel type vehicle according to another exemplary embodiment.

Meanwhile, the impact mitigating systems of the arm-wheel type vehicle 100 according to the exemplary embodiment described above may also be applied to arm-wheel type vehicles 200 and 300 illustrated in FIGS. 7 and 8.

FIG. 7 is a schematic view illustrating an arm-wheel type vehicle 200 according to an exemplary embodiment, and FIG. 8 is a schematic view illustrating an arm-wheel type vehicle 300 according to another exemplary embodiment.

The arm-wheel type vehicle 200 of FIG. 7 includes a main body 210 on which a structure 211 is installed, a plurality of arms 220, a plurality of wheels 230, a first buffer device 240, and a second buffer device 250. The arms 220 on a first side of the main body 210 respectively rotate around axes 220a, 220b, and 220c, and do not share any axis.

The arm-wheel type vehicle 300 of FIG. 8 includes a main body 310 on which a structure 311 is installed, a plurality of arms 320, a plurality of wheels 330, a first buffer device 340, and a second buffer device 350. On a first side of the main body 310, two of the arms 320 rotate around an axis 320a, and a remaining arm 320 rotates around another axis 320b.

According to the arm-wheel type vehicles of the exemplary embodiments, an impact applied to an arm-wheel from a road surface may be mitigated.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in a descriptive sense only and not for purposes of limitation.

What is claimed is:

1. An arm-wheel type vehicle comprising:
   a main body;
   an arm which is rotatably installed to the main body;
   a wheel connected to the arm;
   a first buffer device that is installed on the main body; and
   a second buffer device which is installed on the arm,
   wherein the first buffer device is configured to mitigate an impact moment generated in a rotational direction of the arm due to an external force applied to the wheel,
   wherein the second buffer device is configured to mitigate an impact force generated in a length direction of the arm due to the external force applied to the wheel, and
   wherein the arm comprises:
      a lower arm portion of which a first end is connected to the wheel and of which a second end is connected to the second buffer device;
      an upper arm portion of which a first end is connected to the second buffer device and of which a second end is connected to an installation unit;
      the installation unit which is rotatably installed to the main body and rotatable about an axis; and
      an operating portion that is installed on the installation unit and is connected to the first buffer device.

2. The arm-wheel type vehicle of claim 1, wherein the first buffer device comprises:
   a connection portion that is connected to the operating portion; and
   a first elastic member of which a first end is connected to the connection portion.

3. The arm-wheel type vehicle of claim 2, wherein the first buffer device further comprises a first damper of which a first end is connected to the connection portion.

4. The arm-wheel type vehicle of claim 3, further comprising a variable actuator that is installed on the main body,
   wherein a second end of the first elastic member and a second end of the first damper is connected to the variable actuator.

5. The arm-wheel type vehicle of claim 1, wherein the second buffer device comprises an elastic member,
   wherein a first end of the elastic member is connected to the lower arm portion, and a second end of the elastic member is connected to the upper arm portion.

6. The arm-wheel type vehicle of claim 5, wherein the second buffer device further comprises a damper, and
   wherein a first end of the damper is connected to the lower arm portion, and a second end of the damper is connected to the upper arm portion.

7. The arm-wheel type vehicle of claim 1, wherein at least two arms are rotatably installed with respect to a same axis on a same side of the main body.

8. The arm-wheel type vehicle of claim 7, wherein each second buffer device disposed on the at least two arms mitigates an impact force generated in a length direction of the arm due to an external force applied to the wheel.

9. The arm-wheel type vehicle of claim 8, wherein the at least two arms are connected to the first buffer device which mitigates an impact moment generated in a rotational direction of the arm due to the external force applied to the wheel.

10. The arm-wheel type vehicle of claim 1, wherein at least two arms are installed on each side of the main body, and the at least two arms are rotatably installed with respect to a same axis.

11. The arm-wheel type vehicle of claim 1, wherein at least two arms are installed on each side of the main body, and the at least two arms are rotatably installed with respect to different axes.

12. The arm-wheel type vehicle of claim 1 further comprising a structure disposed on the main body,
   wherein the structure is an equipment suitable for a specific use of the arm-wheel type vehicle.

13. The arm-wheel type vehicle of claim 1, wherein the first buffer device is installed inside the main body.

14. A vehicle comprising:
   a main body;
   at least two arms; and
   a wheel connected to each arm of the at least two arms,
   wherein the at least two arms are rotatably installed to the main body and are rotatable about a single axis,
   wherein each arm is connected to a first buffer device disposed inside the main body, and
   wherein each arm of the at least two arms comprises:
      a lower arm portion of which a first end is connected to the wheel and of which a second end is connected to a second buffer device;
      an upper arm portion of which a first end is connected to the second buffer device and of which a second end is connected to an installation unit;
      the installation unit which is rotatably installed to the main body and rotatable about the axis; and
      an operating portion that is installed on the installation unit and is connected to the first buffer device.

15. The vehicle of claim 14, wherein the second buffer device is configured to mitigate an impact force generated in a length direction of the arm due to an external force applied to the wheel.

16. The vehicle of claim 15, wherein the first buffer device is configured to mitigate an impact moment generated in a rotational direction of the arm due to the external force applied to the wheel.

17. The vehicle of claim 16, further comprising another arm and another wheel connected to the another arm,
wherein the another arm comprises at least a third buffer device configured to mitigate at least one of an impact force generated in a length direction of the other arm due to an external force applied to the other wheel and an impact moment generated in a rotational direction of the other arm due to the external force applied to the other wheel.

* * * * *